June 17, 1924.  1,498,282
P. KAUFFMANN
SADDLE SUSPENSION DEVICE FOR BICYCLES, MOTOR CYCLES, AND THE LIKE
Filed March 28, 1922  2 Sheets-Sheet 1

Inventor.
Paul Kauffmann,
by Henry Wirth Jr. atty

June 17, 1924.
P. KAUFFMANN
1,498,282
SADDLE SUSPENSION DEVICE FOR BICYCLES, MOTOR CYCLES, AND THE LIKE
Filed March 28, 1922    2 Sheets-Sheet 2
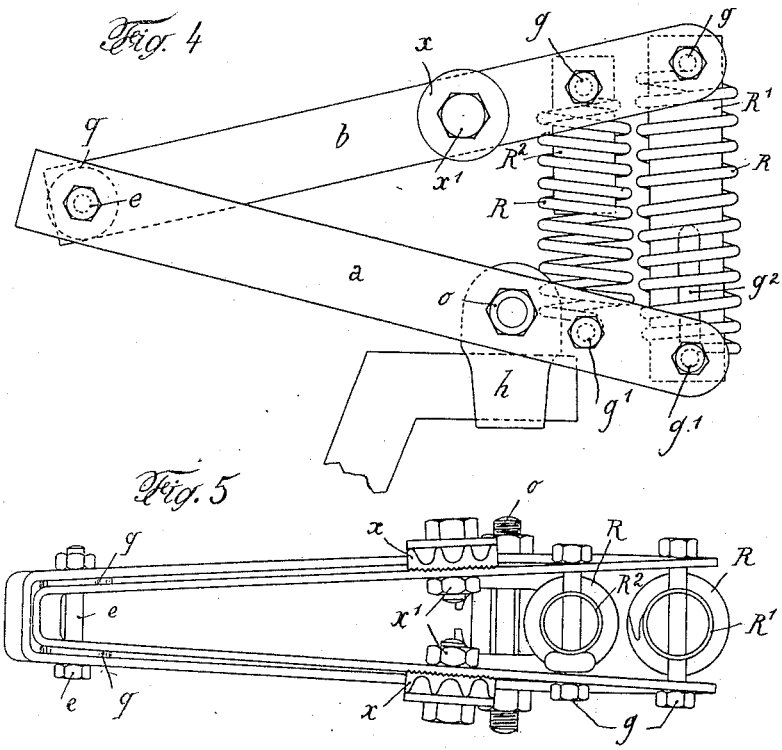
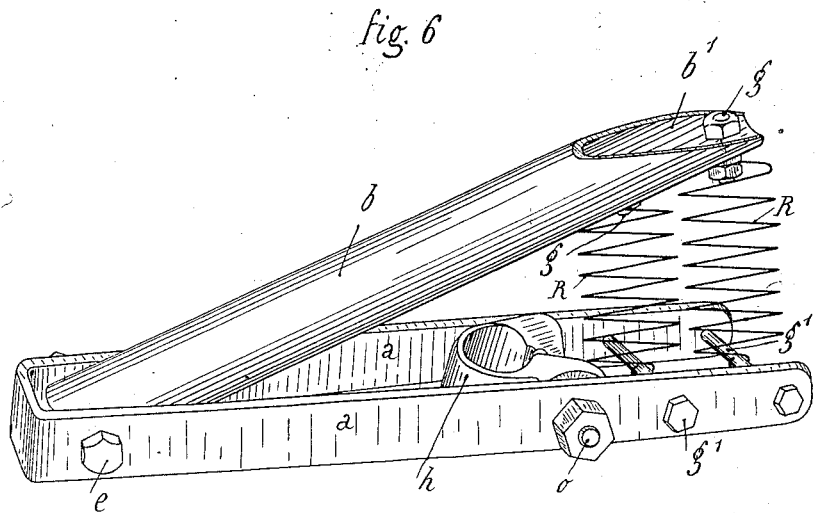

Patented June 17, 1924.

1,498,282

UNITED STATES PATENT OFFICE.

PAUL KAUFFMANN, OF PARIS, FRANCE.

SADDLE-SUSPENSION DEVICE FOR BICYCLES, MOTOR CYCLES, AND THE LIKE.

Application filed March 28, 1922. Serial No. 547,586.

*To all whom it may concern:*

Be it known that I, PAUL KAUFFMANN, a citizen of the Republic of France, and a resident of Paris, France, have invented certain new and useful Improvements in Saddle-Suspension Devices for Bicycles, Motor Cycles, and the like; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to an elastic saddle suspension device of the type comprising two levers or arms pivoted together at one end and having the other ends respectively secured to the saddle and to the frame, the device formed by the pairs of levers operating after the manner of a pair of compasses or scissors, a spring being provided to prevent the approach of the two levers.

The essential features of the said suspension device are as follows:

*a.*—One of the levers or arms is constituted by a sheet metal piece bent into U-shape; within the said arm is mounted and pivoted the second arm which is constituted either by a sheet metal piece also bent into U-shape, or by a tube. By reason of their U-shape or tube form, the said arms are of a very light construction and will not bend or lose their shape, on account of their great moment of inertia. Furthermore, the pivot axle connecting the first arm with the second will prevent any relative movement of the arms except such movements as they may take in the vertical axial plane of the bicycle; this will prevent the saddle from making any side overturning movements or lateral inclination, or any movements tending to place the saddle across the axial plane of the bicycle.

*b.*—An arrangement of two or more springs of the same or different strength is disposed between the pivoted arms or levers and enables the adjustment of the elasticity of the suspension according to the weight of any rider, by mounting the said springs together or separately.

The following description, together with the accompanying drawing which is given by way of example, sets forth embodiments of this invention:

Figs. 4 and 5 are respectively side and plan views of a modified form of construction of the suspension device.

Fig. 6 is a perspective view of a second modified form of construction of the device.

Figure 2:
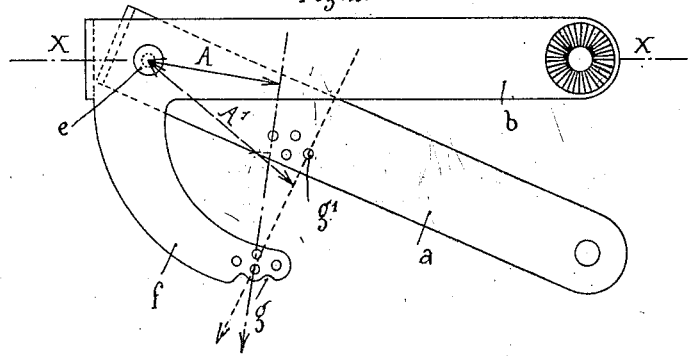
Fig. 2 is a side view of the suspension device on a larger scale.
Figure 3:
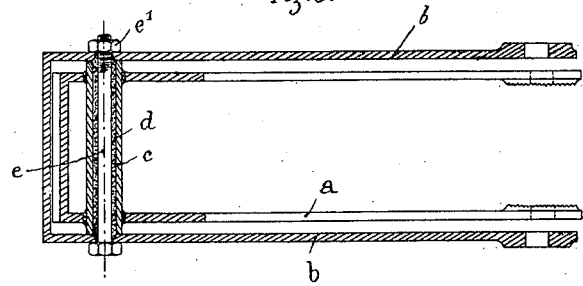
Fig. 3 is a horizontal section on the line X—X, Fig. 2.
Figure 1:
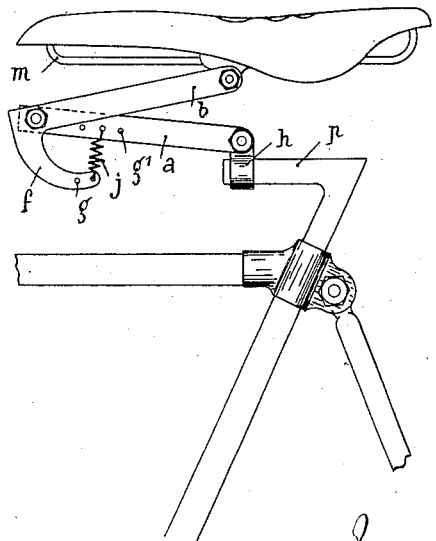
Fig. 1 shows the elastic suspension device for the bicycle mounted in position.

The elastic suspension shown in Figs. 1 to 3 is composed of a fixed arm $a$ and a lever $b$ formed of two strips cut out of steel plate or otherwise and bent into U-shape as shown in the sectional view Fig. 3. The arm $a$ and lever $b$ are pivoted together upon the axle $e$ near the bent portion of the same. To this end, the arm $a$ is traversed by a tube $c$ forming a cross-brace and secured thereto by welding, brazing or like means. A second tube $d$ whose ends have preferably a conical shape is engaged in the first tube $c$ and extends outwardly of the latter for a short distance in order to come in contact with the internal walls of the lever $b$ which are suitably countersunk to receive the ends of the said tube $d$; this small tube $d$ may however be eliminated. A bolt $e$ is inserted in the tube $d$ and is provided with a nut $e^1$. Inasmuch as the arm $a$ is in fixed position as well as the tube $c$, the pivoting will take place by the rotation of the tube $d$ and the bolt $e$ carried by the arm $b$ within the tube $c$. The lever $b$ is extended by two portions $f$ in the shape of a circular arc for example which are provided at the ends with a plurality of perforations $g$.

Opposite the perforations $g$ of the extensions $f$ the branches $a$ are also provided with the apertures $g^1$. These perforations are intended to receive by hooking or in like manner the ends of the coiled springs $j$, these ends being engaged in the apertures corresponding to the tension of the springs which is to be obtained. It will be observed (Fig. 2) that placing the spring on the axis shown in broken lines, will afford a mechanical lever arm A which is less than the lever arm $A^1$ of the spring when placed in the position shown.

The free end of the arm $a$ is secured to the saddle post *p* of the bicycle by means of a bolt traversing a clamping collar *h* of known type. It has been supposed in Fig. 1 that the saddle post is horizontal, but it is obvious that the arrangement is also applicable to oblique or vertical saddle posts, by changing the direction of the collar *h*. The free end of the lever *b* may be connected with the saddle by any suitable means. A bicycle or like saddle thus mounted will by reason of the load carried by the same exert an effort at the end of the lever *b*. This effort by reason of the pivot at the end of the arm *a* will be transmitted to the extensions *f* which are retained by the springs *j*, and thus the springs *j* will be called upon to absorb all the shocks of the road. Furthermore, the disposition of the bent levers together with the cross-piece *c d e* will afford a great lateral rigidity.

In the embodiment shown in Figs. 4 and 5, the suspension is carried out by bands of hoop iron bent into U-shape and forming on the one hand an arm *a* and on the other hand a lever *b* which are pivoted together at the bent portion by means of an axle *e*. The branches of the arm *a* are traversed at about two-thirds their length by a screwthreaded rod *o* which maintains between the said branches a clamping collar *h*, this being preferably striated or provided with radial teeth on the outer sides co-operating with like striated portions or teeth on the inner sides of the branches *a*. The said collar serves to attach the whole device to the saddle post of horizontal or vertical type, the screwthreaded rod *o* clamping the branches *a* upon the collar *h* and the said collar upon the saddle post at the same time.

The reaction can be produced at the end of the two arms of the device by one or more compensating springs R which are preferably guided in the interior for example by the tubes $R^1$ $R^2$. The springs R and the guides $R^1$ and $R^2$ are secured to the branches *a* and *b* by bolts *g* $g^1$ passing through the whole in the transverse sense. To this end, the guides may have a greater or less length and may be provided with apertures $g^2$ having therein the bolts $g^1$ for affording the free movement of the levers *b* and the guides $R^1$. It is obvious that two, three or more springs may be used, these may be of different strength and may be substituted for each other. Since they are at unequal distances from the axle *e* of the apparatus, they may equilibrate the weights of various riders, according as they are used in a certain number, or two together, or only one, and according to the strength of each spring, as well as the greater or less spacing from the axle *e*.

The saddle is maintained by two cores of known type *x*, traversing the saddle wires and secured and pressed upon the levers *b* by the two bolts $x^1$. Upon the axle *e* of the apparatus and between the arms *a* and *b* may be mounted two washers *q* of steel, copper, asbestos or the like for separating the rods *a* and *b* in such manner that during the oscillation of the arm *b* they shall not come in contact, and also for absorbing the shocks of the device, the pressure on the said washers being adjustable by the bolt *e* whose nut can be more or less tightened.

In the embodiment shown in Fig. 6, the lever *b* which was hitherto composed of a piece of hoop iron bent into U-shape, is now formed by a tube having mounted thereon the slide which supports the saddle. This device is of a simpler and more rapid construction and is better adapted to all classes of saddles, all the saddles being provided with a slide collar or like device for mounting upon a tube. Furthermore, with this device the bending moment can be regulated by sliding the saddle slide collar along the tube, and the wires of the saddle along the said slide. As shown in Fig. 6, the tube is preferably cut on a bevel at its end $b^1$, and this disposition will readily allow the use of a wrench upon the bolts *g* securing the springs R. The said bolts are inserted in holes formed at the lower part of the tube *b* in suitable number, in order to be able to equilibrate the weights of riders having a considerable difference, by means of one or more springs of equal or different strengths; these may be employed in any suitable number and disposed at different places at a greater or less distance from the pivoting axis of the device.

The fingers here represent saddle posts or rods in horizontal position, but the same device can be used with vertical or other saddle posts, by simply turning the collar *h* about its screwthreaded rod *o* serving as an axle for the same; and said collar may thus assume all possible positions in order to fit upon all types of saddle post.

What I claim is:—

1. Elastic suspension device for saddles of bicycles, motor cycles and the like, comprising an arm formed of sheet metal bent into U-shape, a collar pivoted to the end of the arm for securing the same to the frame of the machine, a second arm disposed between the branches of the U, a pivot axle connecting the two arms, means for securing the second arm to the saddle, a spring interposed between the two arms tending to prevent them from approaching each other, a second spring situated parallel to the first spring at a distance from the pivot axis which is different from the distance given to the first spring.

2. Elastic suspension device for saddles of bicycles, motor cycles and the like, comprising an arm formed of sheet metal bent into U-shape, a collar pivoted to the end of the arm for securing the same to the frame of the machine, a second arm disposed between the branches of the U, a pivot axle connecting the two arms, means for securing the second arm to the saddle, a spring interposed between the two arms tending to prevent them from approaching each other, a second spring having a different strength from that of the first spring and situated parallel to the first spring at a distance from the pivot axis which is different from the distance given to the first spring.

3. Elastic suspension device for saddles of bicycles, motor cycles and the like, comprising an arm formed of sheet metal bent into U-shape, a collar pivoted to the end of the arm for securing the same to the frame of the machine, a second arm of tube shape disposed between the branches of the U, a pivot axle connecting the two arms, means for securing the second arm to the saddle, a spring interposed between the two arms tending to prevent them from approaching each other, a second spring situated parallel to the first at a distance from the pivot axis which is different from the distance given to the first spring.

In testimony that I claim the foregoing as my invention, I have signed my name hereto.

PAUL KAUFFMANN.